Dec. 9, 1969     S. CAMPANINI     3,482,885

ELECTRIC-PNEUMATIC BRAKE SYSTEM

Filed Nov. 5, 1968

INVENTOR.
Sergio Campanini
BY Parker, Carter & Markey
Attorneys.

United States Patent Office 3,482,885
Patented Dec. 9, 1969

3,482,885
ELECTRIC-PNEUMATIC BRAKE SYSTEM
Sergio Campanini, Lincolnwood, Ill., assignor to Berg Mfg. & Sales Co., Des Plaines, Ill., a corporation of Illinois
Filed Nov. 5, 1968, Ser. No. 773,416
Int. Cl. B60t 13/74
U.S. Cl. 303—7          3 Claims

ABSTRACT OF THE DISCLOSURE

A system effective to fill a trailer brake system and a pneumatic pressure source in response to energizing of the trailer stoplight circuit and to release the trailer brakes pneumatically in response to de-energizing of said circuit.

SUMMARY OF THE INVENTION

A standard trailer brake system having a main fluid pressure tank supplying fluid pressure to a relay emergency valve for delivery to a plurality of brake actuators, and a service line supplying fluid pressure through a two-way check valve to the service piston of said relay emergency valve has incorporated therein a conduit communicating said tank through a pressure regulating valve to the opposite side of said two-way check valve and thus to said relay emergency valve. An electrically openable, normally closed valve is connected to the stoplight circuit of the trailer and, when supplied with electrical energy, opens to deliver fluid pressure from said tank to said relay emergency valve to open the same and fill the trailer brake system. Simultaneously the opening of said electrically openable valve delivers fluid pressure through a one-way check valve to an auxiliary reservoir. A normally open electrically closable valve controls communication between said auxiliary reservoir and an air operated exhaust valve communicating with said relay emergency valve. Upon de-energizing of the stoplight circuit, said last-named, normally open valve opens to deliver fluid pressure from said auxiliary tank to said air-operated exhaust valve means to exhaust the trailer brake system. One version of the invention provides an air-operated exhaust valve for and adjacent each of the brake actuators.

This invention relates to combination tractor-trailer vehicles and particularly to the brake systems thereof.

The delay between operation of the tractor-mounted brake pedal and delivery of fluid pressure to the trailer brake chambers and a delay between release of said foot pedal and the release of the brakes of the trailer is productive of undesirable control effects on the tractor-trailer combination vehicle. Hence it is one purpose of the present invention to provide a system effective to accelerate actuation of the trailer brakes to a point prior to or simultaneously with the actuation of the tractor brakes and to produce release of the trailer brakes substantially simultaneously with the release of the tractor brakes.

Another purpose is to provide a system effective to accelerate the filling of the trailer brake system in response to actuation of the tractor brake pedal and simultaneously to prepare a pneumatic release system effective upon release of said pedal to release the trailer brakes pneumatically.

Another purpose is to provide a system effective in response to energizing of the trailer stoplight circuit to fill the trailer brake system and responsive to de-energizing of the trailer stoplight circuit to release fluid pressure from said system.

Another purpose is to provide a trailer brake application and release system of maximum economy and simplicity.

Other purposes will appear from time to time during the course of the specification and claims.

BRIEF DECRIPTION OF THE DISCLOSURE

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
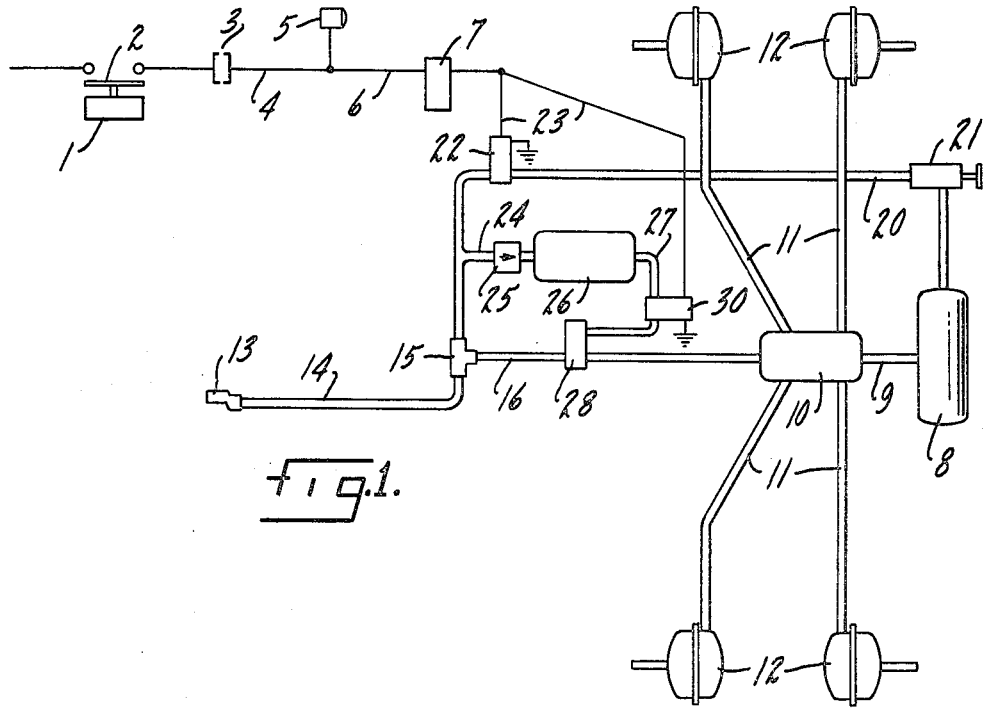
FIGURE 1 is a schematic illustration of the system of the invention.

Referring now to the drawings, the numeral 1 generally illustrates a stoplight switch which is pneumatically actuatable in response to movement of the tractor brake pedal (not shown) toward brakes-on position to close the stoplight switch arm 2 and thus to deliver electrical energy through connector 3 and conductor 4 to the stoplights of the trailer, the stoplights and the stoplight circuit being indicated herein by the light 5 and conductor 6.

Connected in the circuit 5, 6 is a time delay switch or device 7.

The trailer brake system illustrated herein is of substantially standard construction incorporating a main tank 8 communicating, as by conduit 9, with a relay emergency valve 10. The emergency valve 10 communicates as by conduits 11 with individual brake actuating chambers 12. Upon actuation of the tractor brake pedal, fluid pressure is delivered through a tractor service line (not shown) and service gladhand connector 13 to service line 14 which in turn communicates with one inlet side of a two-way check 15. A conduit 16 communicates the outlet of two-way check valve 15 with the area above the service piston (not shown) within relay emergency valve 10. As is well known, delivery of service pressure through elements 13–16 to valve 10 moves the piston therewithin to permit delivery of fluid pressure from tank 8 through conduit 9, valve 10 and conduits 11 to the brake chambers 12 to actuate the same. The time required for the fluid pressure to travel from its source on the tractor to the relay emergency valve 10 creates the deleterious delay referred to above.

To accelerate delivery of fluid pressure to the chambers 12, there is provided herein a conduit 20 having a pressure regulator 21 therein and communicating the tank 8 with the other inlet of two-way check valve 15. Between regulator 21 and valve 15 the conduit 20 has incorporated therein the electrically openable, normally closed valve 22 connected as by conductor 23 with time delay device 7. Between valves 22 and 15 a branch conduit 24 communicates the conduit 20 with a one-way check valve 25 which in turn communicates with an auxiliary fluid pressure reservoir or tank 26 of predetermined volume. A conduit 27 communicates the tank 26 with an air-operated exhaust valve means 28. Within the conduit 27, between tank 26 and valve 28, an electrically closable, normally open valve 30 is positioned.

Figure 2:
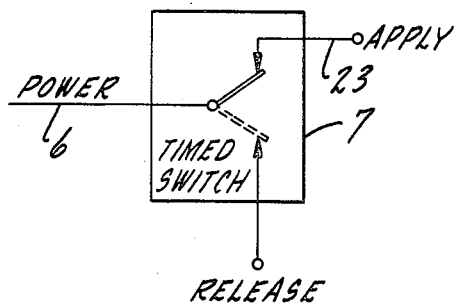
FIGURE 2 is a schematic showing of the time delay device usable with the system.

The use and operation of the invention are as follows:

Upon movement of the tractor brake pedal toward brakes-on position, the switch 1 closes to illuminate the lights 5 and energize the stoplight circuit 5, 6. Thereupon the time delay switch 7, being in its normally closed position illustrated in FIGURE 2, delivers electrical energy to valve 22 to open the same and deliver fluid pressure, at the predetermined setting of regulator 21, from tank 8 through valve 15 and conduit 16 to relay emergency valve 10 and thus to deliver fluid pressure from tank 8 to chambers 12.

Simultaneously, fluid pressure is delivered from tank 8 through conduit 20 and valves 22, 25 to the reservoir 26 to fill the same with a predetermined volume and pressure. Fluid pressure is precluded, however, from escaping from tank 26 by the electrically closed valve 30 which is also connected to conductor 23 and which therefore closed virtually immediately upon the opening of valve 22. Upon release of the foot pedal by the tractor operator, the substantially immediate reduction of fluid pressure to switch 1 produces an opening of the same and a consequent de-energizing of the spotlight circuit 5, 6. It will be understood that the valve 22 will have been opened for a predetermined duration of time, controlled by the time delay device 7. The de-energizing of the circuit 5, 6 produces a return of the valve 30 to its normally open position, thus establishing communication between tank 26 and air-operated exhaust valve means 28 to move the same to exhaust position and thus to exhaust the trailer brake system.

Figure 3:
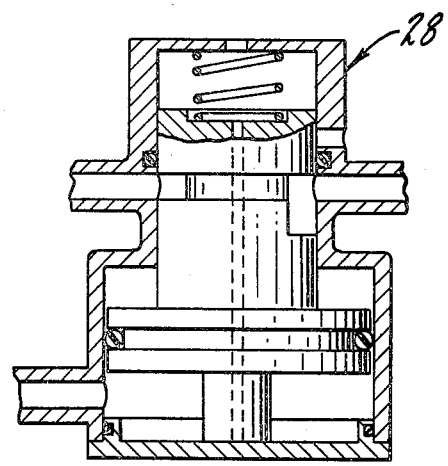
FIGURE 3 is a cross-sectional view of a valve suitable for use with the system of the invention.

While the valve of FIGURE 3 is illustrative only and many similar structures may be employed, it will be observed that the valve has a first position providing straight-through communication in either direction so that the system is fail-safe, i.e. if electrical energy should fail of delivery through device 7, the normal brake pressure remains unaffected.

Similarly, while the valve means 28 is shown as associated in conduit 16, an even more rapid exhaust of the brake actuators 12 may be accomplished by positioning one of the valves 28 in each of the conduits 11. Since the valve means 28 is provided with a bleed capability, it will be understood that the valve means 28 returns to its normal first position within a predetermined time after actuation. While the valve 30 is illustrated as supplied with electrical energy through means 7 and while such connection avoids undue load on the stoplight circuit, it will be understood that the valve 30 may be directly connected with the circuit and a time delay is not necessary to its operation.

The embodiment of the invention in which an exclusive property or privilege is claimed are defined as follows:

1. For use with a trailer brake system having an electrical stoplight circuit, a main fluid pressure tank, a relay emergency valve and a plurality of brake actuators supplied with fluid pressure from said tank through said valve, a conduit communicating said tank with said relay emergency valve, an electrically openable, normally closed valve in said conduit and connected to said stoplight circuit, said valve being openable in response to energizing of said circuit to deliver fluid pressure to said relay emergency valve to open the same for communication between said tank and said actuators, an air-operated exhaust means communicating with said trailer system, said exhaust means having a first position maintaining said system in normal status and a second position exhausting said actuators, an auxiliary fluid pressure tank, a branch conduit communicating said first-named conduit with said auxiliary tank, a one-way check valve permitting delivery of fluid pressure through said branch conduit to said auxiliary tank and precluding delivery in the opposite direction, a conduit communicating said auxiliary tank with said air-operated exhaust means, a normally open, electrically closed valve in said last-named conduit and connected to said stoplight circuit whereby energizing of said stoplight circuit closes said last-named valve to preclude communication between said auxiliary tank and said air-operated exhaust means and de-energizing of said circuit opens said last-named valve to deliver fluid pressure from said auxiliary tank to said air-operated exhaust means to move the same to exhaust position.

2. For use with a trailer brake system having a stoplight circuit and an accelerated system fill means, an auxiliary pressure tank communicating with said fill means for filling of said auxiliary tank in response to and simultaneously with the filling of said system, an electrically closed, normally open valve connected to said stoplight circuit, air-operated exhaust valve means communicating with said trailer brake system, said electrically closed valve precluding communication between said auxiliary tank and said air-operated valve means in response to energizing of said circuit and opening to provide communication between said auxiliary tank and said air-operated valve means in response to de-energizing of said circuit.

3. For use with a trailer brake system having brake actuators and a stoplight circuit, a fluid pressure reservoir, means responsive to energizing of said circuit for delivery of fluid pressure to said system and to said reservoir, fluid pressure operable exhaust means communicable with said system, and means responsive to de-energizing of said circuit for delivery of fluid pressure from said reservoir to said exhaust means.

References Cited
UNITED STATES PATENTS

| 2,169,668 | 8/1939 | Thomas | 188—3 |
| 2,571,885 | 10/1951 | Ingres | 303—8 |
| 3,232,674 | 2/1966 | Stelzer | 303—7 |

MILTON BUCHLER, Primary Examiner

J. J. McLAUGHLIN, Jr., Assistant Examiner

U.S. Cl. X.R.

188—3; 303—3, 15, 20, 28, 68